(12) United States Patent
Ye et al.

(10) Patent No.: US 8,428,632 B2
(45) Date of Patent: Apr. 23, 2013

(54) DYNAMIC ALLOCATION OF SPECTRUM SENSING RESOURCES IN COGNITIVE RADIO NETWORKS

(75) Inventors: Zhuan Ye, Vernon Hills, IL (US); Alan Bok, Naperville, IL (US); Neiyer Correal, Cooper City, FL (US); Spyros Kyperountas, Weston, FL (US); Qicai Shi, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1362 days.

(21) Appl. No.: 12/059,898

(22) Filed: Mar. 31, 2008

(65) Prior Publication Data

US 2009/0247201 A1   Oct. 1, 2009

(51) Int. Cl.
    *H04W 72/00*   (2009.01)
(52) U.S. Cl.
    USPC ............... 455/509; 455/452.2; 455/67.11; 455/161.1; 370/455; 370/341; 704/233
(58) Field of Classification Search ............ 455/509, 455/522, 454, 450, 67.13, 452.2, 67.11, 161.1; 370/241, 329, 461, 237, 455, 341; 375/267, 375/137; 348/732; 342/450; 704/233
    See application file for complete search history.

(56) References Cited

U.S. PATENT DOCUMENTS

| 7,043,428 | B2* | 5/2006 | Li ............................ 704/233 |
| 7,248,567 | B2* | 7/2007 | Desgagne et al. ......... 370/277 |
| 7,457,588 | B2* | 11/2008 | Love et al. ............. 455/67.11 |
| 2004/0028018 | A1* | 2/2004 | Cain ....................... 370/338 |
| 2005/0129051 | A1* | 6/2005 | Zhu et al. .................. 370/445 |
| 2006/0083205 | A1 | 4/2006 | Buddhikot et al. |
| 2006/0084444 | A1* | 4/2006 | Kossi et al. .............. 455/450 |
| 2007/0032254 | A1* | 2/2007 | Chen ........................ 455/509 |
| 2008/0090581 | A1* | 4/2008 | Hu ........................... 455/452.1 |
| 2009/0135744 | A1* | 5/2009 | Chaudhri et al. ......... 370/278 |
| 2010/0165913 | A1* | 7/2010 | Ang et al. ................. 370/328 |

FOREIGN PATENT DOCUMENTS

| WO | 2007 / 043827 A1 | 4/2007 |
| WO | 2007 / 094604 A1 | 8/2007 |

OTHER PUBLICATIONS

S. M. Mishra, A. Sahai, and R. W. Broderson, "Cooperative sensing among cognitive radios", Proc. IEEE ICC2006, Istanbul, Turkey, Jun. 2006—pp. 1658-1663.
A. Gashemi and E. Sousa, "Impact of user collaboration on the performance of sensing-based opportunistic spectrum access", Proc. IEEE VTC 2006, pp. 1-6, Fall 2006.
E. Peh and Y. Liang, "Optimization for cooperative sensing in cognitive radio networks", Proc. IEEE WCNC 2007—4pp.
Y. Liang, Y. Zeng, E. Peh, and A. Hoang, "Sensing—Throughput tradeoff for cognitive radio networks", Proc. IEEE ICC 2007—6pp.
Vishwanthan R. and Varshney P., "Distributed Detection with Multiple Sensors: Part I—Fundamentals", Proc. of the IEEE, pp. 54-63, vol. 85, No. 1 Jan. 1997.

(Continued)

*Primary Examiner* — Mahendra Patel
(74) *Attorney, Agent, or Firm* — Barbara R. Doutre

(57) ABSTRACT

A method, wireless controller, and information processing system are provided to dynamically allocate spectrum sensing resources. A first input (804) including available sensing session time for performing spectrum sensing with respect to one or more primary systems (102) is received. A second input (806) including a set of communication channels to be monitored in the spectrum sensing session is received. A third input (808) including detection constraints associated with a plurality of available sensing nodes (114) in a secondary network (104) for performing the spectrum sensing is received. Spectrum sensing resources are dynamically allocated (814) among a set of the plurality of available sensing nodes (114) based on the first (804), second (806), and third inputs (808).

19 Claims, 7 Drawing Sheets

OTHER PUBLICATIONS

Blum R., Kassam S. and Poor V., "Distributed Detection with Multiple Sensors: Part II—Advanced Topics",Proc. of the IEEE, pp. 64-78, vol. 85, No. 1 Jan. 1997.

] B. Krishnamachari, D. Estrin, and S. Wicker, "The impact of data aggregation in wireless sensor networks", Proc. IEEE ICDCS 2002—4pages.

K.W. Fan, S. Liu, and P. Sinha, "Scalable data aggregation for dynamic events in sensor networks", Proc. SenSys 2006.

Kwang Sik Kim, "PCT/US2009/038036—PCT International Search Report and Written Opinion," WIPO, ISA/KR, Korean Intellectual Property Office, Daejeon, Republic of Korea, Oct. 29, 2009.

* cited by examiner

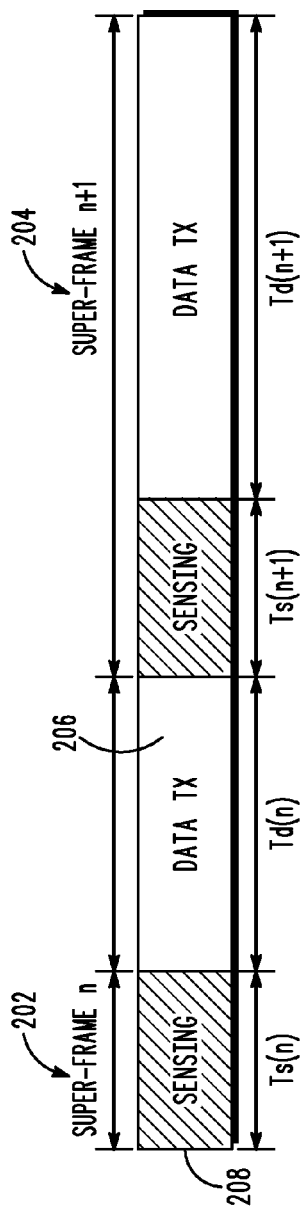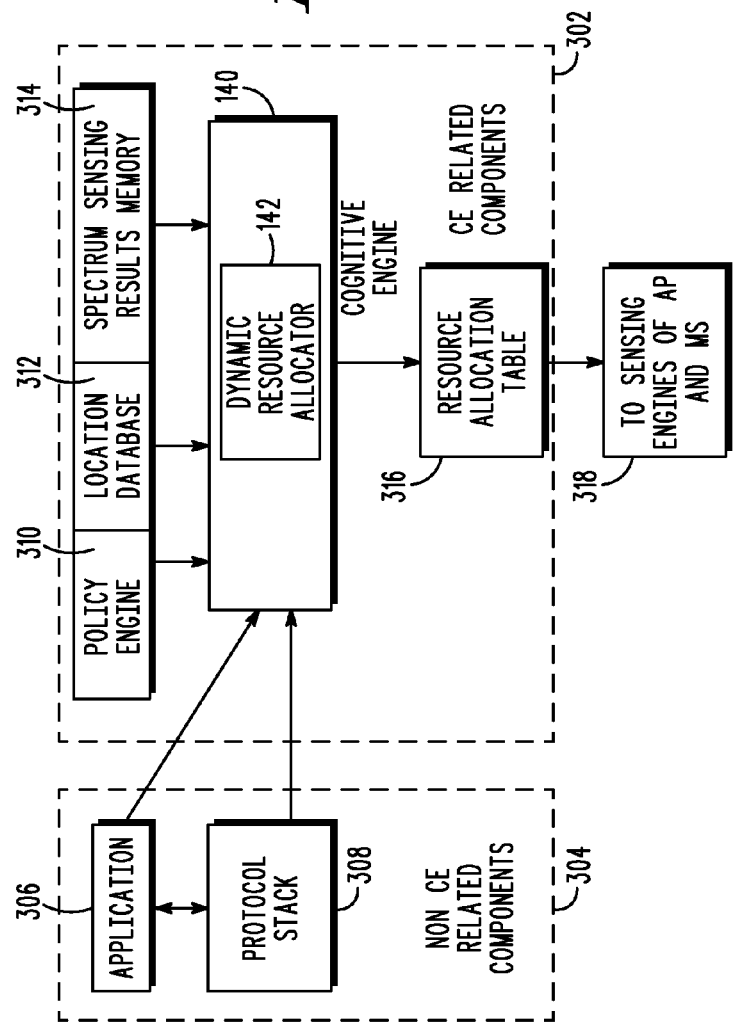

US 8,428,632 B2

DYNAMIC ALLOCATION OF SPECTRUM SENSING RESOURCES IN COGNITIVE RADIO NETWORKS

FIELD OF THE INVENTION

The present invention generally relates to the field of wireless communications, and more particularly relates to managing the allocation of spectrum sensing resources within a cognitive radio network.

BACKGROUND OF THE INVENTION

Wireless communication technology has evolved greatly over the recent years. Recent studies have shown that the wireless spectrum in U.S. is under-utilized, although most of the spectrum has been assigned to licensees, or primary users. Therefore, spectrum sharing has been proposed to alleviate the spectrum scarcity that prevents new wireless services being deployed. Cognitive radio is a promising technology that can allow secondary usage of spectrum without causing harmful interference to the primary systems. The secondary users, or cognitive radios, are required to perform spectrum (channel) sensing before accessing a channel that has been assigned to a licensed or primary user.

In order to reliably detect the primary signal, an individual radio needs to have very high sensitivity to offset the fading and shadowing conditions of a radio channel. To overcome the difficulties that an individual radio experiences in determining channel occupancy, cooperative sensing is proposed to improve the performance of detection. For a more detailed discussion on cooperative sensing see S. M. Mishra, A. Sahai, and R. W. Broderson, "Cooperative sensing among cognitive radios", Proc. IEEE ICC 2006, Istanbul, Turkey, June, 2006 and A. Gashemi and E. Sousa, "Impact of user collaboration on the performance of sensing-based opportunistic spectrum access", Proc. IEEE VTC 2006, pp. 1-6, Fall 2006, both of which are hereby incorporated by reference in their entireties.

In cooperative sensing, the final decision is made by a central node using the sensing data collected by the distributed radios. Although there have been many publications related to cooperative sensing, there is no systematic method on how to dynamically allocate the spectrum sensing resources: such as the sensing time for each candidate channel; the number of radios need to be included in collaborative sensing, and other spectrum sensing resources.

Therefore a need exists to overcome the problems with the prior art as discussed above.

SUMMARY OF THE INVENTION

A method with a wireless communication controller for dynamically allocating spectrum sensing resources in an opportunistic spectrum access wireless communication system is disclosed. The method includes receiving a first input comprising available sensing session time for performing spectrum sensing with respect to one or more primary systems. A second input comprising a set of communication channels to be monitored during spectrum sensing is received. A third input comprising detection constraints associated with a plurality of available sensing nodes in a secondary network for performing the spectrum sensing is received. Spectrum sensing resources are dynamically allocated among a set of the plurality of available sensing nodes based on the first, second, and third input.

In another embodiment, a wireless communication controller is disclosed. The wireless communication controller includes a cognitive engine adapted to receive a first input comprising available sensing session time for performing spectrum sensing with respect to one or more primary systems. A second input comprising a set of communication channels to be monitored during spectrum sensing is received. A third input comprising detection constraints associated with a plurality of available sensing nodes in a secondary network for performing the spectrum sensing is received. The wireless communication controller also includes a dynamic resource allocator communicatively coupled to the cognitive engine. The dynamic resource allocator is adapted to dynamically allocating spectrum sensing resources among a set of the plurality of available sensing nodes based on the first, second, and third input.

In yet a further embodiment an information processing system is disclosed. The information processing system includes a memory and a processor communicatively coupled to the memory. A wireless communication controller is communicatively coupled to the memory and the processor. The wireless communication controller includes a cognitive engine adapted to receive a first input comprising available sensing session time for performing spectrum sensing with respect to a host network. A second input comprising a set of communication channels to be monitored during spectrum sensing is received. A third input comprising detection constraints associated with a plurality of available sensing nodes in a secondary network for performing the spectrum sensing is received. The wireless communication controller also includes a dynamic resource allocator communicatively coupled to the cognitive engine. The dynamic resource allocator is adapted to dynamically allocate spectrum sensing resources among a set of the plurality of available sensing nodes based on the first, second, and third input.

An advantage of various embodiments of the present invention is that spectrum sensing resources for cognitive radio applications are dynamically allocated to account for continuously changing radio and network environments. In particular, various embodiments of the present invention manage the dynamics of a Cognitive Radio ("CR") network that need to satisfy both network throughput requirements and spectrum sensing requirements.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 2 is a block diagram illustrating one example of a super-frame according to one embodiment of the present invention;

FIG. 3 is a detailed view of an information processing system configured to perform dynamic allocation of spectrum sensing resources according to one embodiment of the present invention;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and optionally can wirelessly transmit signals, and may also operate in a wireless communication system. For example, and not for any limitation, a wireless communication device can include (but is not limited to) any one or a combination of the following: a two-way radio, a cellular telephone, a mobile phone, a smartphone, a two-way pager, a wireless messaging device, a laptop/computer, automotive gateway, or a residential gateway.

Wireless Communication System

Figure 1:
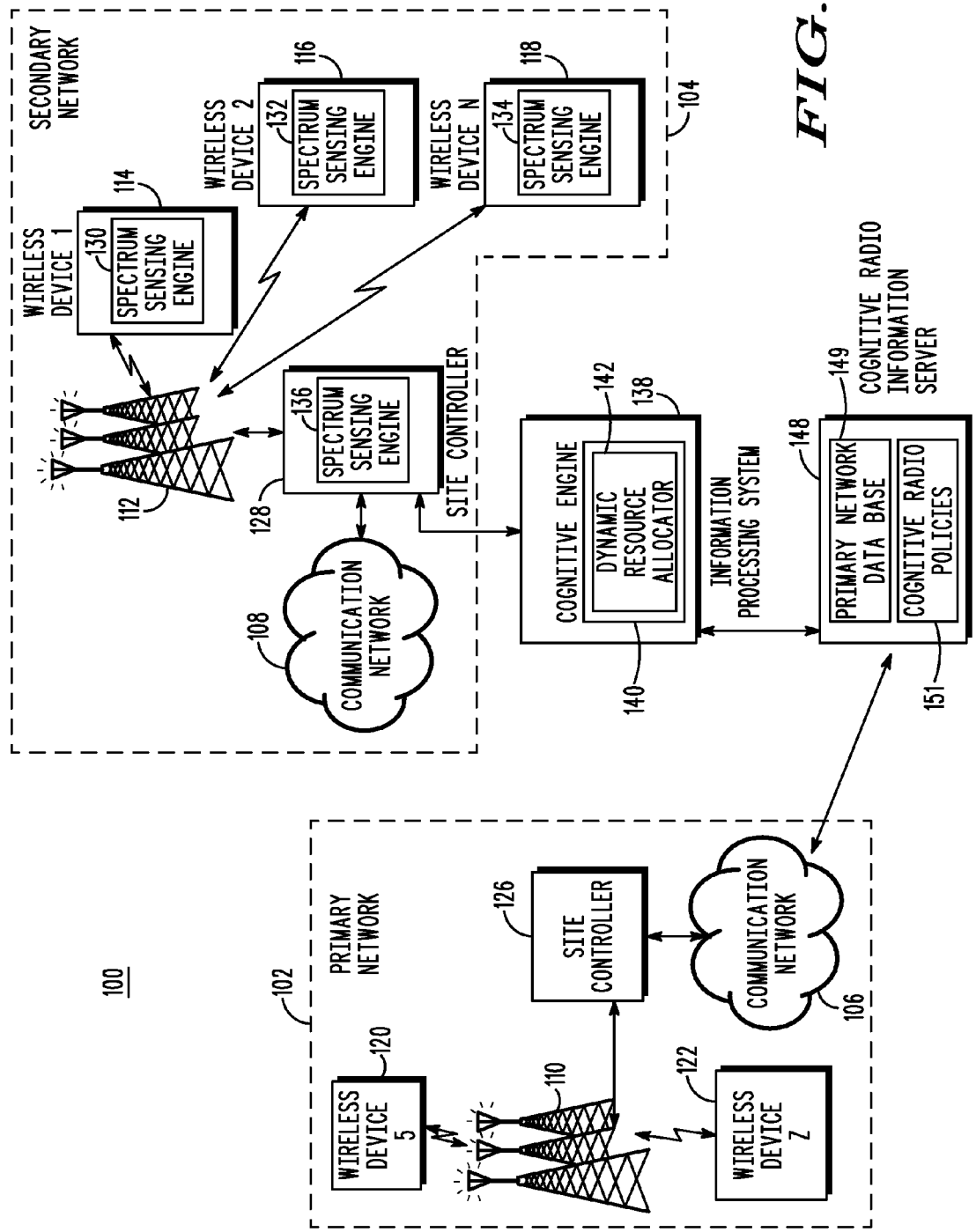
FIG. 1 is block diagram illustrating a wireless communication system according to one embodiment of the present invention.

According to one embodiment of the present invention as shown in FIG. 1 one example of a wireless communication system 100 is illustrated. FIG. 1 shows a plurality of networks 102, 104. Although only two networks 102, 104 are shown, the wireless communication system 100 can comprise additional networks. In one embodiment, one of the networks 102 is a host/primary network and one or more of the additional networks are secondary networks 104. In one embodiment, a host/primary network can be an underlay network and a secondary network can be an overlay network. The host/primary network 102 is assigned RF spectrum that is divided into channels that can potentially be used by the secondary network(s) 104. Throughout this discussion the terms "host" and "primary" that refer to, for example, host/primary network 102, are used interchangeably. The type of wireless communication system that allows for a secondary network to utilize the RF spectrum of a host/primary network is commonly referred to as Cognitive Radio ("CR") system.

Each of the wireless communication networks 102, 104 can include one or more communication networks 106, 108 such as a circuit service network and/or a packet data network. The communication networks 106, 108 can either be wired or wireless. The wireless communications standard of the networks 102, 104 coupling bases stations 110, 112 to mobiles 114 to 122 can comprise Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), other IEEE 802.16 standards, Orthogonal Frequency Division Multiplexing ("OFDM"), Orthogonal Frequency Division Multiple Access ("OFDMA"), Wireless LAN ("WLAN"), WiMAX, or the like. The wireless communications networks 102, 104 are able to be an IP or SIP based connectivity network, which provides data connections at much higher transfer rates then a traditional circuit services network. These networks are able to comprise an Evolution Data Only ("EV-DO") network, a General Packet Radio Service ("GPRS") network, a Universal Mobile Telecommunications System ("UMTS") network, an 802.11 network, an 802.16 (WiMAX) network, Ethernet connectivity, dial-up modem connectivity, or the like.

A circuit services network is able to provide, among other things, voice services to the wireless devices 114 to 122 communicatively coupled to one or both of networks 102, 104. Other applicable communications standards include those used for Public Safety Communication Networks including TErrestrial TRunked rAdio ("TETRA") and P25 Trunking. It should be noted that these network technologies are only used as an illustrative example and do not limit further embodiments of the present invention. Each of the wireless communication networks 102, 104 includes a plurality of base stations 110, 112. Each of the base stations 110, 112 is communicatively coupled to an information processing system 126, 128 such as a site controller 126, 128.

As discussed above, the wireless communication system 100, in one embodiment, is a CR system. In a cognitive radio (CR) system of the type considered for use by IEEE 802.22, a cognitive secondary radio system utilizes spectrum assigned to a primary system using an opportunistic approach. With this approach, the secondary radio system shares the spectrum with primary incumbents as well as those operating under authorization on a secondary basis. Under these conditions, it is imperative that any user in the cognitive radio system not interfere with primary users. Some types of cognitive radio systems (e.g., IEEE 802.22) require that devices sense the channel to detect a licensed, primary user. The devices are allowed to transmit if their transmissions will not interfere with any primary user. This is generally accomplished by the secondary user determining the signal strength of the primary users, and if the signal of any primary user is above a predetermined threshold, the cognitive radio device determines that its transmissions would cause interference to the primary user, and so inhibits transmission.

In the example of FIG. 1, the secondary network 104 includes a plurality of sensing nodes that perform spectrum sensing with respect to the host/primary network 102. For example, one or more of the wireless devices 114, 116, 118 within the secondary network 104 can perform spectrum sensing. Therefore, one or more of the secondary network wireless devices 114, 116, 118 includes a spectrum sensing engine 130, 132, 134 for performing the spectrum sensing. The spectrum sensing engines 130, 132, 134 are discussed in greater detail below. It should be noted that one or more of the base stations 112 within the secondary network 104 can also perform spectrum sensing with respect to the host/primary network 102. Therefore, the site controller 128, in one embodiment, also includes a spectrum sensor 136 as well.

The wireless communication system 100 also includes one or more information processing systems 138 such as a network controller or access point that controls and manages the networks 102, 104. Additionally, the wireless communication system 100 includes one or more cognitive radio information servers 148 that can facilitate the deployment of the CR networks. In one embodiment, the cognitive radio information server 148 includes a primary network database 149 and cognitive radio policies 151.

As discussed above, CR systems in general do not dynamically allocate the spectrum sensing resources to account for the changing environment. Therefore, to overcome this problem the information processing system 138, in one embodiment includes a cognitive engine 140 with a dynamic resource allocator 142 for dynamically allocating spectrum sensing resources. The information processing system 138, in one embodiment, accepts as one or more inputs information associated with primary networks (i.e., information within the primary network database 149) and/or policies 151 regarding cognitive radio network, from the cognitive radio information server 148. Stated differently, the cognitive engine 140 of the information processing system 138 manages the dynamic behavior of cooperative spectrum sensing in cognitive radio networks by dynamically allocating the spectrum sensing resources according to the current network throughput requirement and CR policy requirements. It should be noted that the information processing system 138 can also perform spectrum sensing as well. Spectrum sensing resources can include but are not limited to spectrum sensing time for each candidate channel; the number of radios assigned to perform collaborative sensing per channel; the collaborative sensing method; and the protocol to collect sensing results from different wireless devices. The dynamic management of spectrum sensing resources is discussed in greater detail below.

It should be noted that the present invention is not limited to having a central location comprising the cognitive engine 140 and dynamic resource locator 142. For example, a distributed system can be used comprising various nodes within the wireless communication system. One or more of the nodes can include a cognitive engine 140 and dynamic resource locator 142. Each of the nodes can communicate information to the other nodes to be used by each cognitive engine 140 and dynamic resource locator 142 so spectrum sensing resources can be dynamically allocated.

Dynamic Spectrum Sensing Resource Allocation and Management

At the outset, distributed sensing was motivated for the most part by military surveillance applications. For example, in radar detection, a group of sensors work to make a multi-sensor decision regarding the presence or absence of a target based on radar return. In many cases, complete observations are sent to the fusion center and where optimal detection algorithms are employed. Research in this field then evolved to consider decentralized processing. A review of two influential survey papers (Vishwanthan R. and Varshney P., "Distributed Detection with Multiple Sensors: Part I—Fundamentals", Proc. of the IEEE, pp. 54-63, vol. 85, No. 1 Jan. 1997 and Blum R., Kassam S. and Poor V., "Distributed Detection with Multiple Sensors: Part II-Advanced Topics", Proc. of the IEEE, pp. 64-78, vol. 85, No. 1 Jan. 1997, which are hereby incorporated by reference in their entireties), which summed up results from 61 and 71 papers in the field respectively, indicates that much of the publicly available literature in the field focuses on developing computationally efficient detection algorithms at the sensors and fusion center.

A related problem, data aggregation, has been studied under the wireless sensor network ("WSN") topic (See Vishwanthan R. and Varshney P., "Distributed Detection with Multiple Sensors: Part I—Fundamentals", Proc. of the IEEE, pp. 54-63, vol. 85, No. 1 Jan. 1997 and Blum R., Kassam S. and Poor V., "Distributed Detection with Multiple Sensors: Part II-Advanced Topics", Proc. of the IEEE, pp. 64-78, vol. 85, No. 1 Jan. 1997.). In WSN, the sensing nodes are energy constrained and the network structure is also highly dynamic, therefore an optimal data aggregation method is needed to achieve energy efficiency. These results could be applied to the cooperative spectrum sensing, in particular, the design of the cooperation protocol that collects sensing results from individual radios. However, cooperative spectrum sensing differs greatly from WSN because in CR applications, spectrum sensing is an auxiliary functionality, whereas the main goal is to maximize CR network throughput while limiting interference to the primary users.

Therefore, spectrum sensing needs to be considered together with the network throughput requirement. Accordingly, various embodiments of the present invention, for example, implement a cognitive engine 140 with a dynamic resource allocator 142 that determines when to perform spectrum sensing and how long the devices in the network must be quiet in order to perform spectrum sensing. Then the cognition engine 140, determines the optimal way to perform spectrum sensing by dynamically allocating sensing resources appropriately. The allocation of sensing resources includes but is certainly not limited to the data aggregation method. The interaction between application/network QoS requirement and spectrum sensing is not considered in the data aggregation for WSN.

In one embodiment, the CR network such as the wireless communication system 100 of FIG. 1 operates on a super-frame by super-frame basis. FIG. 2 shows one example of a sequence of super-frames 202, 204. There are two types of frames in each super-frame: data communication frames 206 and spectrum sensing frames 208. A time division protocol, in one embodiment, is used to divide the super-frame 202 into the two smaller frames 206, 208. The duration of the spectrum sensing frame 208 and the frequency of sensing frame 208 can vary in time in order to satisfy the network throughput requirements. The network throughput requirements can vary based on the requirements of different applications.

In one embodiment, the cognitive engine 140 at the information processing system 138 dynamically changes the frame structure of the super-frame 202, 204 to allow for dynamic spectrum sensing. Based on an application's (306 in FIG. 3) network throughput requirement and the policy requirement (310 of FIG. 3) of a CR network such as the wireless communication system 100, the cognitive engine 140 of the information processing system 138 dynamically determines the following two key parameters for spectrum sensing: 1.) when spectrum sensing should be performed (e.g., the length of the current data transmission frame decides the starting time of next spectrum sensing frame) and 2.) the length of the spectrum sensing frame (e.g., the longer the spectrum sensing frame, the lower the network throughput).

As far as the spectrum sensing is concerned, the first parameter only controls the synchronization of spectrum sensing, since a quiet period is likely needed. The second parameter is the key constraint for the purpose of resource allocation of spectrum sensing. The cognitive engine 140 (via the dynamic resource allocator 142) of the information processing system 138 also considers the following parameters when dynamically allocating spectrum resources: 1.) if a list of candidate channels that need to be sensed exists, the dynamic resource allocator 142 determines how many of the channels in the list are to be sensed; 2.) the dynamic resource allocator 142 determines how long should the sensing time for each channel be, since the total sensing time is predetermined; and 3.) the dynamic resource allocator 142 determines how many radios should participate in the sensing for a particular channel, if cooperative sensing is used.

The information processing system 138, in one embodiment, via the cognitive engine 140 and the dynamic resource allocator 142 performs a systematic method to address these issues by casting the administration of cooperative spectrum sensing as a dynamic resource allocation problem. The information processing system 138 is shown in greater detail with respect to FIG. 3. In particular, FIG. 3 shows the system architecture of the information processing system 138 for dynamically allocating resources for spectrum sensing.

The functional components inside a CR radio can be divided into Cognition Engine ("CE") related components, as shown by the first dashed box 302 and non-CE related components, as shown by the second dashed box 304. As discussed above, the information processing system 138 includes a cognitive engine 140 including a dynamic resource allocator 142 for managing spectrum sensing and performing dynamic allocation of the spectrum sensing resources (e.g., spectrum sensing time for each candidate channel; the number of radios assigned to perform collaborative sensing per channel; the collaborative sensing method; and the protocol to collect sensing results from different wireless devices).

FIG. 3 also shows various components within the information processing system 138 that act as inputs for the cognitive engine 140 and the dynamic resource allocator 142. For example, FIG. 3 shows one or more applications 306 and a protocol stack 308 at the non-CE related portion 304 of the information processing system 138. FIG. 3 also shows a policy engine 310, a location database 312, and a spectrum sensing results memory 314 at the CE-related side 302 of the information processing system 138. The application(s) 306, in one embodiment, is a network throughput statistics application that can dynamically determine the length of the sensing frame 202 for the next super-frame 204. For example, if the application 306 determines that a heavy load is expected on the network 102, the application 306 can stipulate a shortened sensing period (i.e., longer data communication period) and relay this to the cognitive engine 140. This sensing frame can vary in length in a frame-by-frame basis, but not necessarily. The application protocol stack 308, in one embodiment, derives certain network statistics for the cognitive engine 140. For example, the application protocol stack 308 can determine the communication cost related to cooperative spectrum sensing.

The policy engine 310 includes various policies such as those that determine how primary users on the host/primary network 102 are to be protected. Stated differently, the policy engine 310 can include policies that help mitigate interference between secondary wireless devices 114, 116, 118 and the primary wireless devices 120, 122. The policy engine 310 communicates with the cognitive radio information server 148 to update policies 151 periodically or when the AP location is changed. The policy engine 310 allows the cognitive engine 140 to derive the current requirement on spectrum sensing such as the probability of detection for a particular primary system and use this as one input. The location database 312 includes location dependent information such as the candidate channel list for the specific location where the CR network such as the wireless communication system 100 is located. The spectrum sensing results memory 314 includes spectrum sensing results received from the spectrum sensing nodes such as the base stations 110, 112, the wireless devices 114, 116, 118, and/or the information processing system 138 itself. These spectrum sensing results are used by the cognitive engine 140 and the dynamic resource allocator 142 to determine future resource allocation for spectrum sensing.

The cognitive engine takes the inputs received from the application(s) 306, application protocol stack 308, policy engine 310, location database 312, and the spectrum sensing results memory 314, and based on these inputs the dynamic resource allocator generates a resource allocation table 316 for cooperative spectrum sensing. This resource allocation table 316 is then transmitted to the sensing nodes for use by the spectrum sensing engines as shown by box 318. Because the inputs received by the cognitive engine 140 and the dynamic resource allocator 142 are continually changing, the resource allocation table 316 is periodically updated. For example, the dynamic resource allocator 142 can update the resource allocation table 316 after every sensing frame 208, every super-frame 202, or at any other given point in time.

Figure 4:
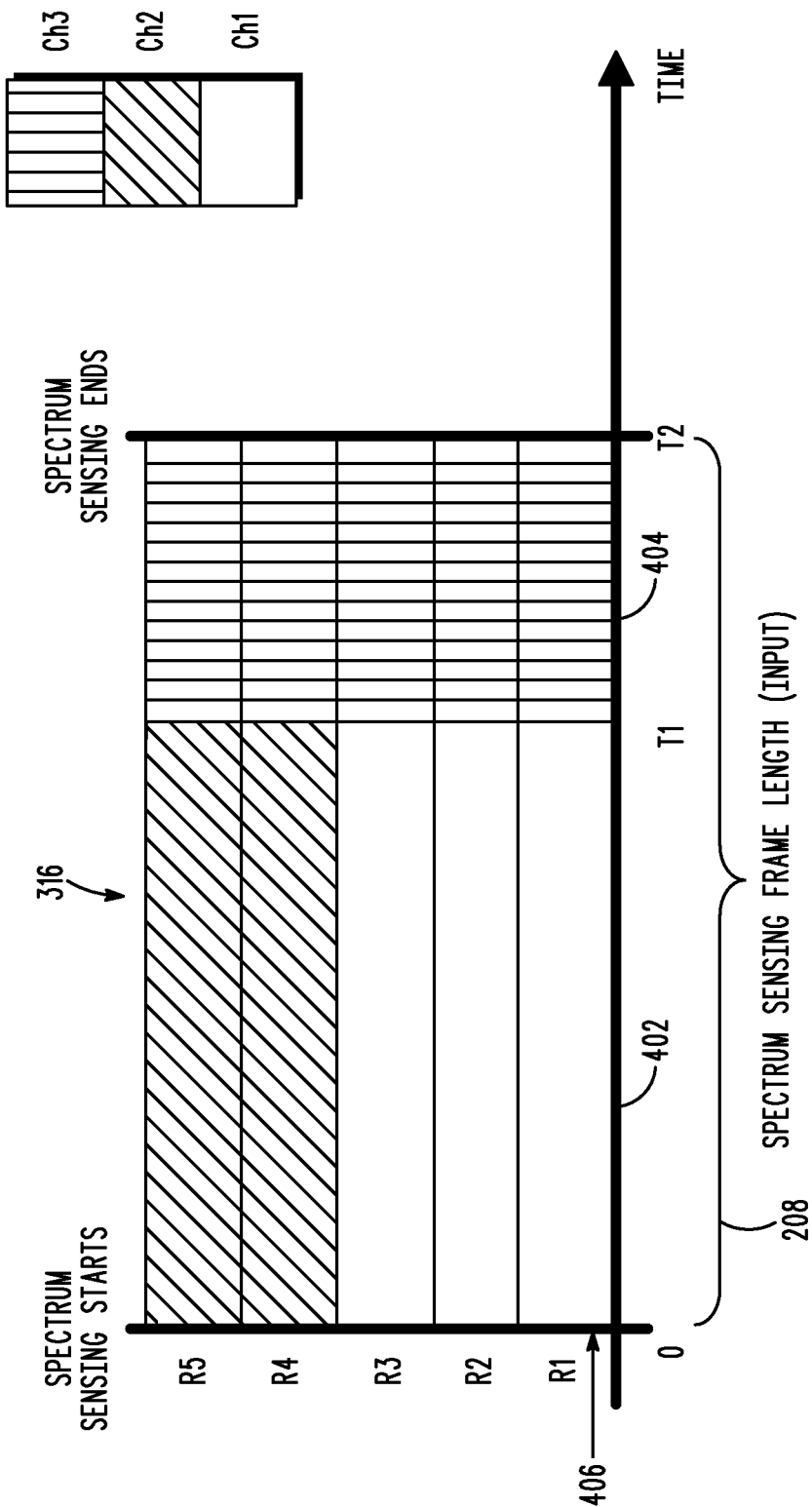
FIG. 4 is a timing diagram illustrating resource allocation over time according to one embodiment of the present invention.

FIG. 4 shows one example of the resource allocation table 316. In particular, the resource allocation table 316 of FIG. 4 includes an entry for a particular sensing node such as sensing node R1, sensing node R2, sensing node R3, sensing node R4, and sensing node R5. The example of FIG. 4 shows that 5 sensing nodes in the secondary network 104 can be used to perform cooperative spectrum sensing for 3 channels selected for the region where the secondary network 104 is deployed. It should be noted that the dynamic resource allocator 142 is not limited to using all available sensing nodes within the network 104. For example, if only five sensing nodes are available then the dynamic resource allocation can choose a number of sensing nodes that is less than five. The spectrum sensing frame 208 is further divided into sub-frames 402, 404, where in each sub-frame 402, 404 a sensing node performs sensing on only one particular channel. In the first sub-frame 402 inside the spectrum sensing frame 208, 3 sensing nodes, sensing node R1, sensing node R2, and sensing node R3, are used to sense channel 1, and 2 sensing nodes, sensing node R4 and sensing node R5, are used to sense channel 2.

In the second sub-frame 404 in the spectrum sensing frame 208, all 5 sensing nodes to sense channel 3. As an example, FIG. 4 shows that a first entry 406 specifies that: from time 0 to time T1, sensing node R1 is to participate in sensing channel 1 and from time T1 to time T2 the sensing node R1 is to participate in sensing channel 3. As can be seen, the dynamic resource allocator 142 is able to dynamically allocate the sensing resources, which could vary between frames.

Although in the example of FIG. 4 a sensing node is assumed to only perform sensing on one particular channel, the present invention is not limited to such an implementation. For example, if the RF front end has wider bandwidth than that of one channel, a sensing node can then perform sensing on more than one channel in each sub-frame.

Current CR systems generally use a fixed number of sensing nodes, which is usually all of the available sensing nodes that are available to perform sensing. These current CR systems also use one fixed sensing time or a set of predetermined sensing periods. Using all available sensing nodes is problematic because bandwidth and other critical resources become constrained. Using a fixed sensing period does not take the changing environment into account and can also place constraints on system resources. As can be seen from FIG. 4 above, the dynamic resource allocator 142 takes into account many factors such as spectrum sensing requirements and network throughput requirements to determine an optimized number of sensing nodes to select for perform sensing. The dynamic resource allocator 142 also dynamically determines the amount of time each selected sensing node is to perform the sensing operation on a particular channel. Stated differently (and as can be seen from FIG. 4), the dynamic resource allocator 142 can dynamically set a sensing period, dynamically select a number of sensing resources to perform sensing within that sensing period, dynamically select the channels to be sensed within that sensing period, and divide the sensing period into sub-periods that can be used further sensing of different channels (e.g. sensing node R1 is to perform sensing from time T0 to T1 fro channel 1 and from T1 to T2 for channel 3).

A possible implementation goal of the resource allocation performed by the dynamic resource allocator 142 is to maximize the combined achievable network throughput across all candidate channels. In this embodiment, it is assumed that there are k channels in the candidate channel list (which can reside in the location database 312). Normally, the channels in the channel list are identified to be vacant based on previous sensing results. However, these channels might have different capacities due to the different maximum transmit powers and different environmental noise levels. Therefore, $C_j$ is defined as the achievable network throughput (NT) if a sensing node uses a particular channel j, given by, $$NT_j = (1 - P_{fa,j})C_j. \quad (1)$$

The achievable throughput is scaled by the probability of correctly identifying the availability of a particular channel, where $P_{fa,j}$ is the probability of false alarms for that particular channel. So the spectrum sensing resources are allocated by the dynamic resource allocator 142, in one embodiment, to maximize the total achievable network throughput, given by, $$NT = \sum_{j=1}^{k} (1 - P_{fa,j})C_j. \quad (2)$$

The maximization is constrained by the limited sensing resources, constraints include, but are not limited to: 1.) the probability of detection for each channel which is to be no less than what is specified by the policy engine 310; 2.) the total sensing time across all the channels which combined must be smaller or equal to T, which is determined by application requirement (e.g., determined by the application 306) (this T parameter can vary from time to time, therefore requires the allocation to be updated frame-by-frame); and 3.) the total number of radios is limited to N, which is the number of radios in the current CR network such as the wireless system 100 of FIG. 1.

Figure 5:
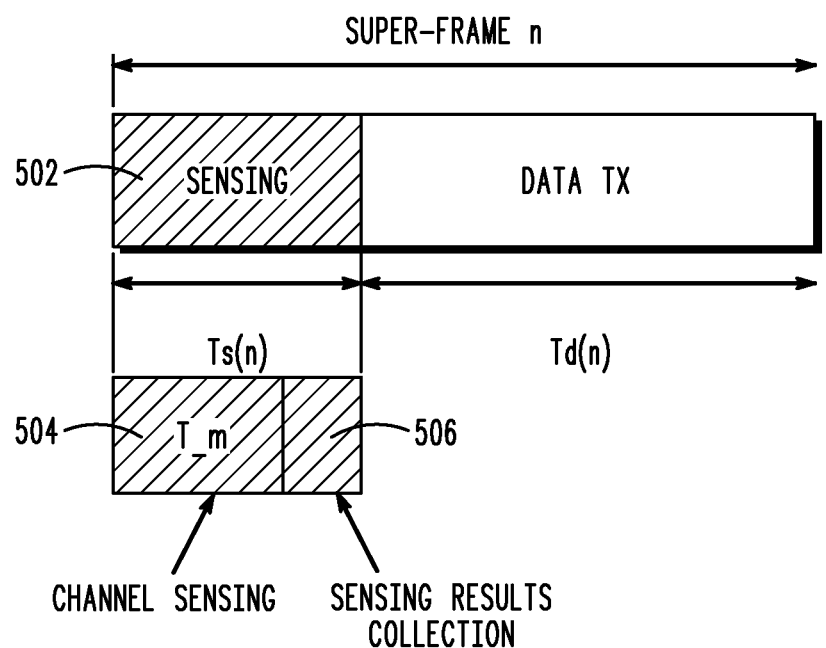
FIG. 5 is s block diagram showing partitioning of a sensing frame within a super frame according to one embodiment of the present invention.

The following is a simplified example that demonstrates the need for the optimal dynamic allocation of spectrum sensing resources performed by the dynamic resource allocator 142. In this example, it is assumed that in each sensing super-frame 502 (FIG. 5), the sensing function is only performed on one channel. It is also assumed that for this particular channel, the directive from the policy engine 310 is to achieve a desired level of spectrum sharing. Namely, the probability of false alarm is to be less than a certain percentage when there is no primary user present. The sensing frame 502 comprises a channel sensing sub-frame 504 and a sensing results reporting sub-frame 506. In the channel sensing sub-frame 504, all sensing nodes perform sensing on the channel condition.

All the sensing nodes remain quiet during this sub-frame 504, acting as sensing receiver only. In the sensing results collection sub-frame 506, the information processing system 138 collects the sensing results from the sensing nodes that participated in the cooperative sensing. The spectrum sensing resources, in this example, therefore include: the number of radios that can participate in the cooperative spectrum sensing and the length of the channel sensing frame and the channel collection frame. The optimization objective, in this example, is to maximize the potential network throughput (NT) of the primary user if the primary user is present, i.e., $$NT_p = (1 - P_{md}) \cdot C_p, \quad (3)$$

where $C_p$ is the channel capacity of the primary user, and $P_{md}$ is the probability of misdetection from spectrum sensing.

Because the sensing nodes cannot change anything about the primary system's channel capacity, equation (3) is simply reduced to minimize the probability of misdetection, or maximize the probability of detection, with respect to the primary user. The current example assumes that the following parameters are known or already determined based on policy from the policy engine 310 and the application requirement determined by the application 306: 1.) the overall network level probability of false alarm: $Q_{fa}$; 2.) the total sensing period: T (although the time T might vary adaptively based on network load and environment dynamics, it should be determined before scheduling the next spectrum sensing operation); and 3.) sensing results transmit time per radio per channel: C (there is a communication cost associated with the sensing results collection, no matter hard decision combing (one bit) or soft combining (quantized measurement data)). Based on these assumptions, the general cooperative sensing optimization problem is formulated as: Given total sensing period T, where $T = T_m + (N-1)*C$, choose N, such that the spectrum sensing performance is optimal in terms of equation (3).

The following is a cooperative sensing example where individual sensing nodes perform power detection based sensing. Based on a Constant False Alarm Rate ("CFAR") assumption, the problem becomes how to find the value of N such that the network throughput of equation (1) is maximized. It can be seen that maximizing equation (1) is equivalent to minimizing:

$$w = \ln((1-p_d)^N) = N \ln(1-p_d) \quad (4)$$

In order to find the N so that equation (3) can be minimized, the derivative with respect to N is taken and is set to 0, $$\frac{dw}{dN} = \ln(1 - p_d) - \frac{N}{1 - P_d} \cdot \frac{dP_d}{dN} = 0 \quad (5)$$

In both equation (4) and equation (5), Pd is the radio level probability of detection, which is a function of N. M is defined to be the product of observation time and signal bandwidth. This example further assumes that all the time measurements in the following derivation are normalized with respect to the reciprocal of signal bandwidth. In other words, when the total sensing period is referred to as T, this means that the product of the sensing period and bandwidth is T. For the sake of completeness, the derivation of Pd is repeated as follows. When the time-bandwidth product M is large enough, the output of power detector (Y) can be approximated by a Gaussian probability distribution function (pdf) as $$Y \sim N\left(\sigma_x^2, \frac{2\sigma_x^4}{M}\right) \quad (6)$$

where $\sigma_x^2$ is the variance of the input signal x[n], which is assumed to be zero mean and Gaussian distributed.

The spectrum sensing example was considered based on CFAR detection and the collaborative sensing using OR decision combining. Given a pre-determined network level false alarm probability $Q_{fa}$, based on equation (2), the false alarm probability of a radio is derived by $$P_{fa} = 1 - (1 - Q_{fa})^{1/N} \qquad (7)$$

Therefore the threshold used in the power detector can be derived by $$\gamma = \sigma_x^2 \left(1 + \frac{Q^{-1}(P_{fa})}{\sqrt{M/2}}\right) \qquad (8)$$

Then the detection probability at each radio is determined by the power of the signal, or the signal to noise ratio ("SNR"), i.e., $$P_d = Q\left[\frac{Q^{-1}(P_{fa}) - \sqrt{M/2}\, SNR}{1 + SNR}\right] \equiv Q(u) \qquad (9)$$

where Q is a complimentary error function. From equation (5), the derivative of Pd with respect to N is calculated using equation (9), $$\frac{dP_d}{dN} = \frac{dQ}{du} \cdot \frac{du}{dN} \equiv Y \cdot Z \qquad (10)$$

After an algebraic calculation, Y and Z can be determined using equations (11) and (12), respectively.

$$Y = -\frac{1}{\sqrt{2\pi}} e^{-u^2/2} \qquad (11)$$

$$Z = \frac{1}{1 + SNR} \left\{ \frac{\sqrt{2\pi} \exp\left((Q^{-1}(P_{fa}))^2/2\right) \cdot}{(1 - Q_{fa})^{\frac{1}{N}} \ln(1 - Q_{fa})} + \frac{SNR \cdot C}{\sqrt{8M}} \right\} \qquad (12)$$

In equation (12), C is the communication time for each radio to send its sensing result to the controller. The total sensing period T, the power detection dwell time M, and the communication cost C satisfies $$T = M + (N-1) \cdot C \qquad (13)$$

Combining equations (10), (11), and (12), and then plugging the result into equation (5) yields:

$$\frac{dw}{dN} = \ln(1 - P_d) - \frac{N \cdot Y \cdot Z}{1 - P_d} = 0 \qquad (14)$$

By solving equation (14), the optimal number of sensing nodes N can be found, such that the collaborative spectrum sensing can achieve maximal probability of detection on the primary user, given the pre-determined total sensing period, the communication time of sensing result per radio, and the expected signal power of primary user (or SNR).

As can be seen from the above discussion, various embodiments of the present invention can dynamically allocate spectrum sensing resources (such as the spectrum sensing time for each candidate channel; the number of radios assigned to perform collaborative sensing per channel; the collaborative sensing method; and the protocol to collect sensing results from different MS. When the sensing super-frame starts, the CR network will perform collaborative spectrum sensing based on the optimal resource allocation) for cognitive radio applications. The various embodiments manage the dynamics of a CR network that needs to satisfy both network throughput requirement and spectrum sensing requirements.

Sensing nodes such as the base stations, wireless devices, and/or the network controller/access point perform spectrum sensing. A time division protocol is used to divide the time into two types of super-frames: a data communication super-frame and a spectrum sensing super-frame. The spectrum sensing related tasks are limited to the dedicated spectrum-sensing super-frame. These tasks include spectrum sensing (measurement collection and processing) and reporting of the sensing results to the information processing system 138 when collaborative sensing is used. Based on the QoS requirement of the application and the CR policy requirement, the cognitive engine 140 determines the time duration to perform spectrum sensing and the duration of the spectrum sensing super-frame. In addition to the policy engine, the geolocation database 312 inside the information processing system 138 determines the number of candidate channels for spectrum sensing, and the sensing requirements on these channels, such as probabilities of detection and false alarm. These dynamic parameters are then sent to the cognition engine 140, where the dynamic resource allocator 142 performs optimal spectrum sensing resource allocation in a dynamic fashion.

Exemplary Wireless Device

Figure 6:
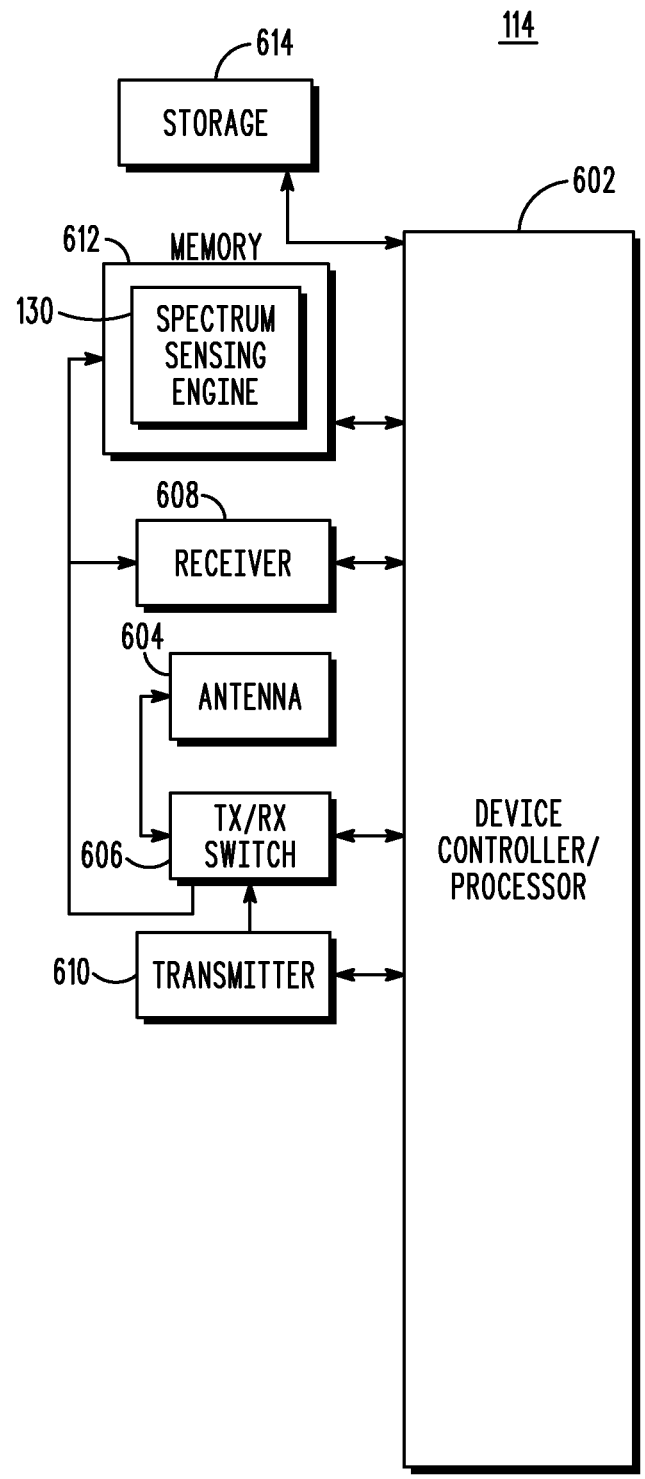
FIG. 6 is a block diagram illustrating a detailed view of a wireless device according to one embodiment of the present invention.

FIG. 6 is a block diagram illustrating a detailed view of a wireless device 114 according to one embodiment of the present invention. It is assumed that the reader is familiar with wireless communication devices. To simplify the present description, only that portion of a wireless communication device that is relevant to the present invention is discussed. The wireless device 114 operates under the control of a device controller/processor 602, that controls the sending and receiving of wireless communication signals. In receive mode, the device controller 602 electrically couples an antenna 604 through a transmit/receive switch 606 to a receiver 608. The receiver 608 decodes the received signals and provides those decoded signals to the device controller 602.

In transmit mode, the device controller 602 electrically couples the antenna 604, through the transmit/receive switch 606, to a transmitter 610. It should be noted that in one embodiment, the receiver 608 and the transmitter 610 are a dual mode receiver and a dual mode transmitter for receiving/transmitting over various access networks providing different air interface types. In another embodiment a separate receiver and transmitter is used for each of type of air interface. A memory 612 includes, among other things, the spectrum sensing engine 130, which has been discussed above. The wireless device 114, also includes non-volatile storage memory 614 for storing, for example, an application waiting to be executed (not shown) on the wireless device 114.

Information Processing System

Figure 7:
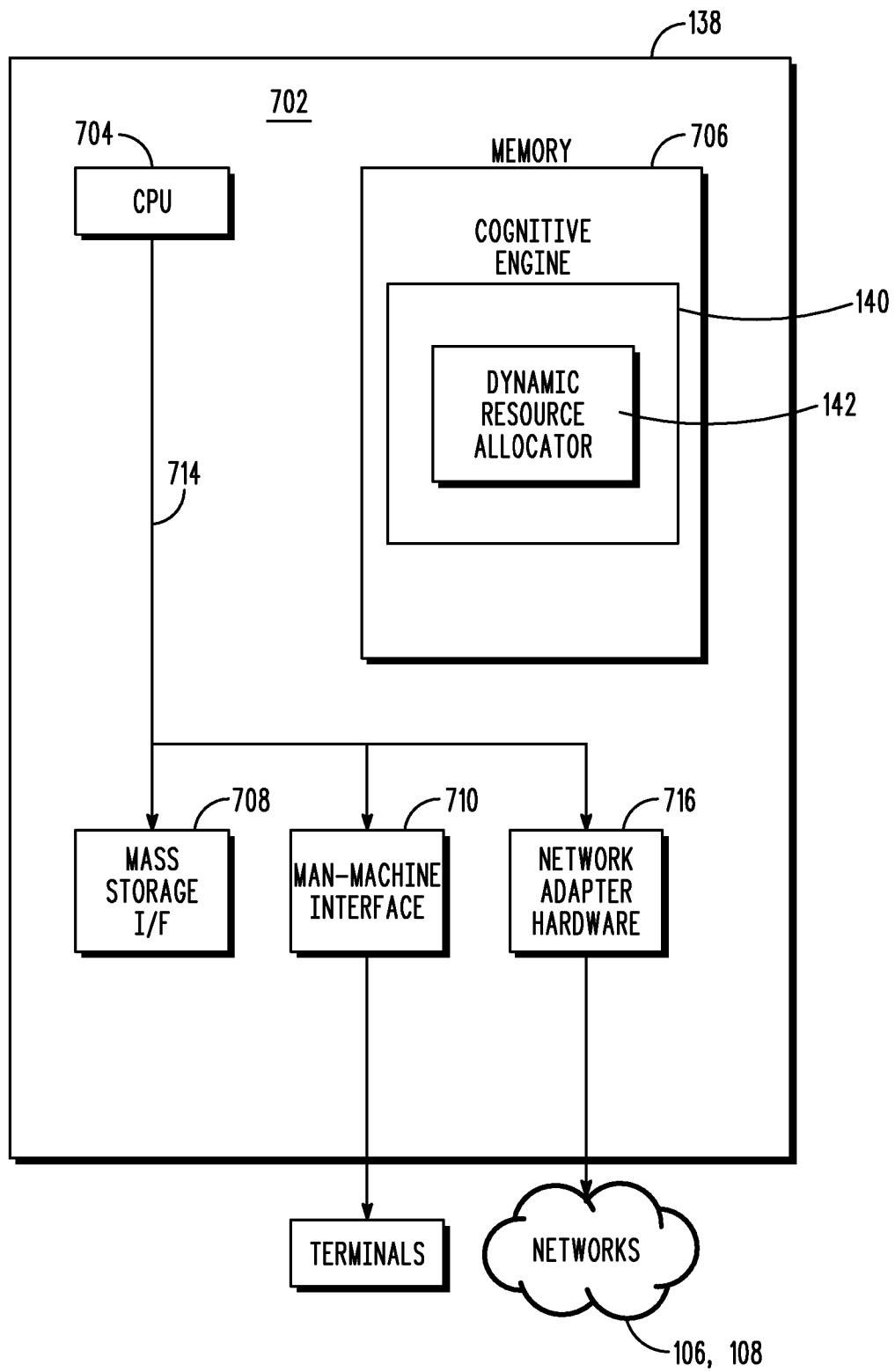
FIG. 7 is a block diagram illustrating a detailed view of an information processing system according to one embodiment of the present invention.

FIG. 7 is a block diagram illustrating a more detailed view of an information processing system 138. It should be noted that although the following discussion is with respect to the information processing system 138 comprising the cognitive engine 140 and the dynamic resource allocator 142, the information processing system 138 is based upon a suitably configured processing system adapted to implement one embodiment of the present invention. For example, a personal computer, workstation, or the like, may be used. The information processing system 138 includes a computer 702. The computer 702 has a CPU processor 704 that is connected to a main memory 706, a mass storage interface 708, a man-machine interface 710, and network adapter hardware 716. A system bus 714 interconnects these system components.

The main memory 706 includes the cognitive engine 140, the dynamic resource allocator 142, the application 306, application protocol stack 308, policy engine 310, location database 312, and spectrum sensing results 314 (which can be included in the memory 706 or a separate data store on the information processing system 138), which have been discussed in greater detail above.

Although illustrated as concurrently resident in the main memory 706, it is clear that respective components of the main memory 706 are not required to be completely resident in the main memory 706 at all times or even at the same time. Furthermore, one or more of these components can be implemented as hardware. The mass storage interface 708 can store data on a hard-drive or media such as a CD or DVD. The man-machine interface 710 allows technicians, administrators, and other users to directly connect to the information processing system 138 via one or more terminals 718. The network adapter hardware 716, in one embodiment, is used to provide an interface to the communication network 106, 108. Certain embodiments of the present invention are able to be adapted to work with any data communications links, including present day analog and/or digital techniques or via a future networking mechanism.

Process of Dynamically Allocating Spectrum Sensing Resources

Figure 8:
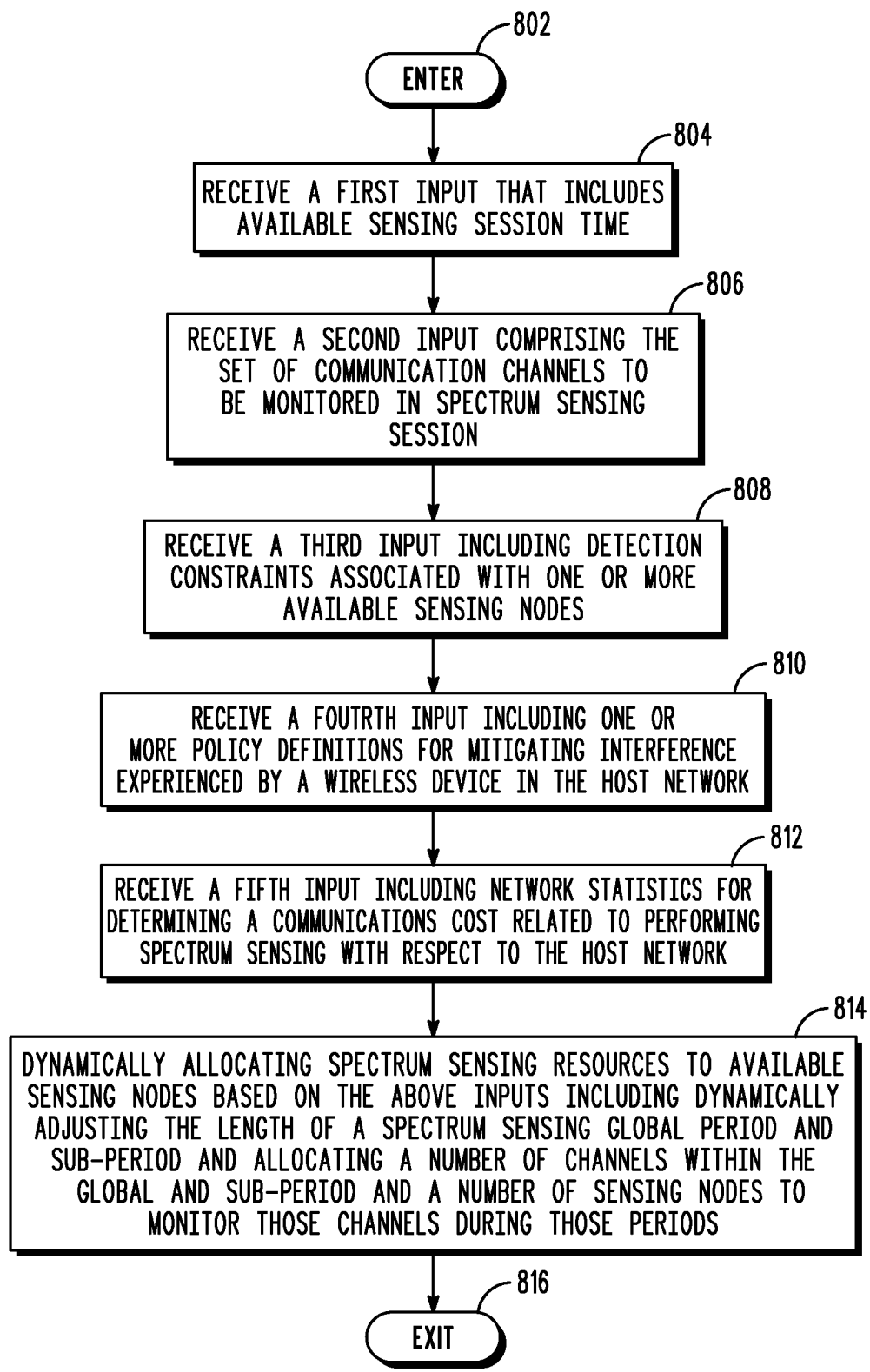
FIG. 8 is an operational flow diagram illustrating a process of dynamically allocating spectrum sensing resources according to one embodiment of the present invention.

FIG. 8 is an operational flow diagram illustrating process of dynamically allocating spectrum sensing resources according to one embodiment of the present invention. The operational flow diagram of FIG. 8 begins at step 801 and flows directly to step 802. The cognitive engine 140, at step 804, receives a first input that includes available sensing session time. A second input, at step 806, is received by the cognitive engine 140 that includes the set of channels to be monitored during spectrum sensing. The cognitive engine 140, at step 808, receives a third input that includes detection constraints associated with one or more available sensing nodes 112, 114, 116, 118. A fourth input, at step 810, is received by the cognitive engine 140 that includes one or more policy definitions for mitigating interference experienced by a wireless device 120, 120 in the host network during spectrum sensing.

The cognitive engine 140, at step 812, receives a fifth input that includes network statistics for determining a communication cost related to performing spectrum sensing with respect to the host network 102. The dynamic resource allocator 142, at step 814, dynamically allocates spectrum sensing resources to available sensing nodes 112, 114, 116, 118, based on the above inputs. The dynamic resource allocator 142 dynamically adjusts the length of a spectrum sensing global period 405 and sub-period 402, 404. The dynamic resource allocator 142 allocates a number of channels within the global 405 and sub-period 402, 404 and a number of sensing nodes 112, 114, 116, 118 to monitor those channels during those periods. The control flow then exits at step 816.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for dynamically allocating spectrum sensing resources in an opportunistic spectrum access wireless communication system, the method comprising:

at a wireless communication controller:
receiving a first input comprising available sensing session time for performing spectrum sensing with respect to one or more primary systems;
receiving a second input comprising a set of communication channels to be monitored during spectrum sensing;
receiving a third input comprising detection constraints associated with a plurality of available sensing nodes in a secondary network for performing the spectrum sensing;
receiving a fourth input comprising one or more policy definitions defining interference mitigation parameters for mitigating interference between potential transmissions of the secondary network on a communication channel in the set of communication channels and a wireless device in the one or more primary systems communicating on the communication channel; and
dynamically allocating spectrum sensing resources among a set of the plurality of available sensing nodes based on the first, second, third, and fourth input; and
wherein dynamically allocating spectrum sensing resources comprises at least one of: allocating based on a throughput requirement, generating a resource allocation table, calculating cost of spectrum sensing, or selecting available sensing nodes.

2. The method of claim 1, wherein dynamically allocating spectrum sensing resources further comprises:
dynamically adjusting a length of at least one of a global spectrum sensing frame within a super-frame and at least one sub-frame within the global spectrum sensing frame.

3. The method of claim 2, wherein dynamically adjusting a length of at least one of a global spectrum sensing frame further comprises:
dynamically determining a suitable length of observation time to perform spectrum sensing according to a current network throughput requirement.

4. The method of claim 2, wherein dynamically allocating spectrum sensing resources further comprises:
allocating at least one communication channel in the set of communication channels to be monitored for spectrum sensing by at least one of the available sensing nodes during a first sub-frame in the global spectrum sensing frame.

5. The method of claim 4, wherein dynamically allocating spectrum sensing resources further comprises:
allocating at least one different communication channel in the set of communication channels to be monitored for spectrum sensing by the at least one of the available sensing nodes during a second sub-frame in the global spectrum sensing frame.

6. The method of claim 1, wherein dynamically allocating spectrum sensing resources further comprises:
generating a resource allocation table; and
transmitting the resource allocation table to a set of the sensing nodes selected to perform spectrum sensing with respect to the one or more primary systems.

7. The method of claim 6, wherein the resource allocation table comprises:

a plurality of communication channels in the set of communication channels that are to be monitored during spectrum sensing;
a set of sensing nodes in the plurality of available sensing nodes that are to monitor one or more of channels in the plurality of communication channels during spectrum sensing; and
at least one time period that indicates when each sensing node in the set of sensing nodes is to perform spectrum sensing with respect to at least one communication channel in the plurality of communication channels associated with each sensing node.

8. The method of claim 1, wherein dynamically allocating spectrum sensing resources further comprises:
dynamically selecting a number of the available sensing nodes to perform the spectrum sensing with respect to the one or more primary systems.

9. The method of claim 1, further comprising:
receiving a fifth input comprising network statistics for determining a communication cost related to performing cooperative spectrum sensing on a given communication channel within the set of communication channels.

10. A wireless communication controller comprising:
a cognitive engine for:
receiving a first input comprising available spectrum sensing session time for performing spectrum sensing with respect to one or more primary systems;
receiving a second input comprising a set of communications channels to be monitored in the spectrum sensing session time;
receiving a third input comprising detection constraints associated with a plurality of available sensing nodes in a secondary network for performing the spectrum sensing; and
receiving a fourth input comprising one or more policy definitions defining interference mitigation parameters for mitigating interference between potential transmissions of the secondary network on a communication channel in the set of communication channels and a wireless device in the one or more primary systems communicating on the communication channel; and
a dynamic resource allocator communicatively coupled to the cognitive engine for:
dynamically allocating spectrum sensing resources among a set of the plurality of available sensing nodes based on the first, second, third, and fourth input, wherein dynamically allocating spectrum sensing resources comprises at least one of: allocating based on a throughput requirement, generating a resource allocation table, calculating cost of spectrum sensing, or selecting available sensing nodes.

11. The wireless communication controller of claim 10, wherein the dynamic resource allocator further dynamically allocates spectrum sensing resources by:
dynamically adjusting a length of at least one of a global spectrum sensing frame within a super-frame and at least one sub-frame within the global spectrum sensing frame.

12. The wireless communication controller of claim 11, wherein the dynamic resource allocator further dynamically allocates spectrum sensing resources by:
allocating at least one channel in the set of channels to be monitored for spectrum sensing by at least one of the available sensing nodes during a first sub-frame in the global spectrum sensing frame.

13. The wireless communication controller of claim 12, wherein the dynamic resource allocator further dynamically allocates spectrum sensing resources by:
allocating at least one different channel in the set of channels to be monitored for spectrum sensing by the at least one of the available sensing nodes during a second sub-frame in the global spectrum sensing frame.

14. The wireless communication controller of claim 10, wherein the dynamic resource allocator further dynamically allocates spectrum sensing resources by:
generating a resource allocation table; and
transmitting the resource allocation table to a set of the sensing nodes selected to perform spectrum sensing with respect to the one or more primary systems.

15. The wireless communication controller of claim 14, wherein the resource allocation table comprises:
a plurality of communication channels in the set of communication channels that are to be monitored during spectrum sensing;
a set of sensing nodes in the plurality of available sensing nodes that are to monitor one or more of channels in the plurality of communication channels during spectrum sensing; and
at least one time period that indicates when each sensing node in the set of sensing nodes is to perform spectrum sensing with respect to at least one communication channel in the plurality of communication channels associated with each sensing node.

16. An information processing system comprising:
a memory;
a processor communicatively coupled to the memory; and
a wireless communication controller communicatively coupled to the memory and the processor, wherein the wireless communication controller comprises:
a cognitive engine for:
receiving a first input comprising available spectrum sensing session time for performing spectrum sensing with respect to one or more primary systems;
receiving a second input comprising a set of communications channels to be monitored in the spectrum sensing session time;
receiving a third input comprising detection constraints associated with a plurality of available sensing nodes in a secondary network for performing the spectrum sensing; and
receiving a fourth input comprising one or more policy definitions defining interference mitigation parameters for mitigating interference between potential transmissions of the secondary network on a communication channel in the set of communication channels and a wireless device in the one or more primary systems communicating on the communication channel; and
a dynamic resource allocator communicatively coupled to the cognitive engine for:
dynamically allocating spectrum sensing resources among a set of the plurality of available sensing nodes based on the first, second, third, and fourth input, wherein dynamically allocating spectrum sensing resources comprises at least one of: allocating based on a throughput requirement, generating a resource allocation table, calculating cost of spectrum sensing, or selecting available sensing nodes.

17. The information processing system of claim 16, wherein the dynamic resource allocator further dynamically allocates spectrum sensing resources by:

dynamically adjusting a length of at least one of a global spectrum sensing frame within a super-frame and at least one sub-frame within the global spectrum sensing frame.

18. The information processing system of claim 17, wherein the dynamic resource allocator further dynamically allocates spectrum sensing resources by:
    allocating at least one channel in the set of channels to be monitored for spectrum sensing by at least one of the available sensing nodes during a first sub-frame in the global spectrum sensing frame.

19. The information processing system of claim 16, wherein the dynamic resource allocator further dynamically allocates spectrum sensing resources by:
    generating a resource allocation table, wherein the resource allocation table comprises:
        a plurality of channels in the set of channels that are to be monitored during spectrum sensing;
        a set of sensing nodes in the plurality of available sensing nodes that are to monitor one or more of the channels in the plurality of channels during spectrum sensing; and
        at least one time period that indicates when each sensing node in the set of sensing nodes is to perform spectrum sensing with respect to at least one channel in the plurality of channels associated with each sensing node; and
    transmitting the resource allocation table to a set of the sensing nodes selected to perform spectrum sensing with respect to the one or more primary systems.

* * * * *